Sept. 19, 1944.  E. R. WEAVER ET AL  2,358,369
LOADING PATCH FOR STATIC TESTS
Filed Dec. 31, 1943
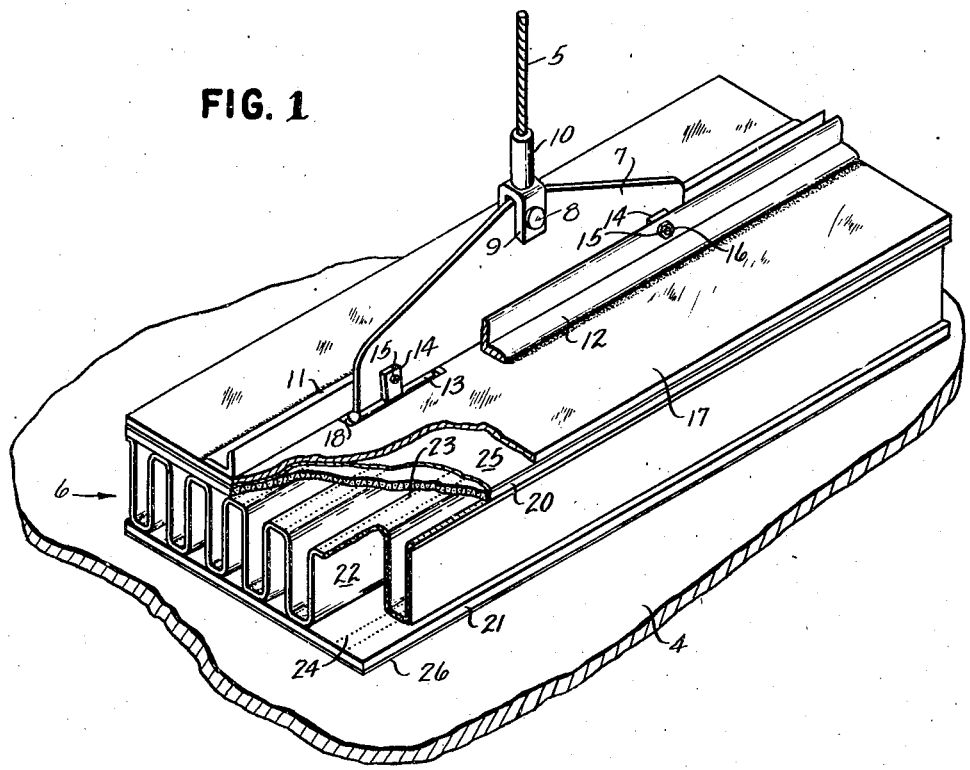
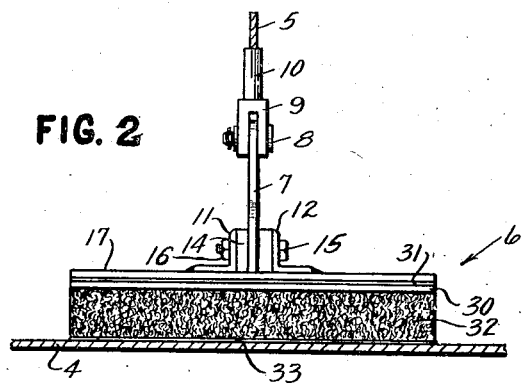
INVENTORS
EDGAR R. WEAVER
PAUL H. KEMMER
ATTORNEYS Patented Sept. 19, 1944

2,358,369

UNITED STATES PATENT OFFICE 2,358,369

LOADING PATCH FOR STATIC TESTS

Edgar R. Weaver, Dayton, and Paul H. Kemmer, Fairfield, Ohio

Application December 31, 1943, Serial No. 516,550

3 Claims. (Cl. 73—51)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to loading patches, which are flexible pads adapted to be cemented to the surfaces of an airplane to permit known loads to be imposed upon the latter while stationary, in so-called "static" tests. In our pending application Ser. No. 294,344 filed September 11, 1939, loading patches, each composed of sponge rubber, adhering to two layers of rubber, are cemented to the top surfaces of an airplane to permit suspension of the entire airplane from cables attached to several of these patches, so as to subject the wings and other parts to tension, compression and shear stresses to test the strength and deflection of various parts of the airplane under controlled loads. However, rubber is a strategic material and is becoming increasingly scarce, and there is a need for a loading patch which contains no rubber whatever.

This invention aims to provide an improved loading patch containing no rubber which has adequate strength and which may be made to adhere firmly to any of the surfaces of an airplane or other structure under static tests.

In the accompanying drawing showing two embodiments of the invention:

Figure 1 is a perspective view, with parts broken away, of one form of loading patch, shown cemented to an airplane surface; and Figure 2 is an end elevation of another form of the invention.

Referring particularly to the drawing, the airplane part 4, only a fragment of which is shown, is suspended from a cable 5 by our novel loading patch, indicated generally at 6. An upright, flat, elongated plate 7 is secured by a stud 8 and clevis 9 to the cable anchor 10, and serves as a hanger, being located between and secured to two parallel angle bars 11, 12, in turn secured to the top of the loading patch body. Rods 13 (only one being shown) are welded to the lower edge of the flat plate 7, and engage the bottoms of blocks 14 arranged in pairs, each pair of blocks being secured by a bolt 15 and nut 16 to the plate. Angle bars 11, 12 are welded to the upper surface of a metal plate 17 which forms the top of the loading patch. In some instances plate 17 may be of plywood. Top plate 17 may be appropriately curved (not shown) where the loading patch is to be secured to concave or convex surfaces, to obviate uneven distribution of tension in the body of the loading patch. Plate 17 is preferably recessed as at 18 to receive rods 13, and the upright plate 7 may oscillate slightly relative to top plate 17, the blocks 14 and bolts 15 permitting such movement. Also the entire loading patch, and any part suspended from it, may oscillate on stud 8, whose axis is at right angles to the axis of rods 13. The described arrangement permits the loading patch to accommodate itself to the load even though it is at an acute angle to the line of suspension through cable 5. Many different constructions may be employed to suspend the loading patches of our invention from a cable or other load-sustaining means, and the invention is not limited to use with any particular suspending means.

The body of the preferred loading patch is made entirely of cotton fabric, such as sized cotton duck, and comprises a top layer 20 of double filled duck, a bottom layer 21 of the same material, and a cotton fabric looped member 22 providing a series of webs which are under tension when a load is applied. The loops are double stitched to the top layer 20 and to the bottom layer 21, as indicated at 23 and 24 respectively, and should be of material sufficiently strong to withstand a total load in tension of 2000 lb. or more. For some tests the patch will be about 24" x 6", having thickness (height) of about 1½" to 2". The top layer will be cemented as at 25 to the underside of plate 17 by a cement such as Goodrich 316M or Minnesota Mining EC613 (a neoprene cement), or any other glue having adequate strength and resistance to softening under the conditions of the test, and the bottom layer 21 will likewise be cemented as at 26 to the airplane surface 4. In the drawing, the thickness of the cement layers is of course exaggerated.

Now referring to Fig. 2, showing a modification (like parts being similarly numbered and hence not described a second time), in lieu of an all cotton body, we may employ a piece of sheepskin, with the skin layer 30 cemented as at 31 to the underside of the top plate 17, and the wool fibers 32 cemented directly to the airplane structure 4, as indicated at 33. No lower layer corresponding to layer 21 is required. Unbleached sheepskin would be preferred, since bleaching weakens the wool fibers. Such a patch will easily sustain a load of 2000 lb. in tension. In place of sheepskin, the skins of goats, alpacas, llamas, dogs and other hairy or fur-bearing animals could be employed.

After completion of the tests, both forms of loading patch are removed from surface 4 by employing a chemical which softens the cement without injuring the surface. Obviously the invention may be used in static tests of many objects other than airplanes.

What we claim is:

1. A loading patch entirely free of rubber and comprising an upper layer of flexible material adapted to be secured to suspension means, and a plurality of spaced flexible load-sustaining members of fibrous material secured to the upper layer and extending vertically downwardly therefrom and adapted to be temporarily secured to a portion of the object to be tested.

2. The invention according to claim 1, wherein the upper layer is of cotton duck or the like, the flexible load-sustaining members are a plurality of loops formed from a single sheet of cotton duck or the like and stitched at their upper ends to the upper layer, and a lower layer, also of cotton duck, is also stitched to the lower ends of the loops, the loops thus providing tension or load-carrying members.

3. The invention according to claim 1, wherein the flexible load-sustaining members are animal hair or wooly fibers naturally secured to the skin from which they grew, the skin itself forming said upper layer.

EDGAR R. WEAVER.
PAUL H. KEMMER.